(12) United States Patent
Erpenbeck

(10) Patent No.: US 11,454,264 B2
(45) Date of Patent: Sep. 27, 2022

(54) TOLERANCE-COMPENSATING DEVICE

(71) Applicant: WITTE Automotive GmbH, Velbert (DE)

(72) Inventor: Till Erpenbeck, Velbert (DE)

(73) Assignee: WITTE Automotive GmbH, Velbert (DE)

(*) Notice: Subject to any disclaimer, the term of this patent is extended or adjusted under 35 U.S.C. 154(b) by 290 days.

(21) Appl. No.: 16/693,033

(22) Filed: Nov. 22, 2019

(65) Prior Publication Data

US 2020/0173472 A1 Jun. 4, 2020

(30) Foreign Application Priority Data

Nov. 29, 2018 (DE) .......................... 102018130388.2

(51) Int. Cl.
*F16B 5/02* (2006.01)
*F16B 5/06* (2006.01)

(52) U.S. Cl.
CPC .......... *F16B 5/0241* (2013.01); *F16B 5/0628* (2013.01); *F16B 5/0635* (2013.01)

(58) Field of Classification Search
CPC .... F16B 5/0088; F16B 5/0233; F16B 5/0241; F16B 5/025; F16B 5/0258; F16B 5/0283; F16B 5/0628; F16B 5/065; F16B 5/0635; F16B 5/0657; F16B 5/0664; F16B 41/002; Y10T 403/45; Y10T 403/454; Y10T 403/75
USPC ..................................... 403/220, 224, 408.1
See application file for complete search history.

(56) References Cited

U.S. PATENT DOCUMENTS

| | | | | |
|---|---|---|---|---|
| 2,861,618 A * | 11/1958 | Tinnerman | ............ | F16B 37/041 411/175 |
| 4,286,642 A * | 9/1981 | Keatley | ..................... | F16F 1/36 403/220 |
| 5,039,264 A * | 8/1991 | Benn | ..................... | F16B 37/041 411/175 |
| 5,288,191 A * | 2/1994 | Ruckert | ................ | F16B 5/0233 403/409.1 |
| 6,474,917 B2 * | 11/2002 | Gauron | ................ | F16B 37/044 411/112 |
| 6,971,830 B2 * | 12/2005 | Hulin | .................... | F16B 5/0635 411/112 |

(Continued)

FOREIGN PATENT DOCUMENTS

| | | |
|---|---|---|
| DE | 4224575 A1 | 3/1993 |
| DE | 10300991 A1 | 7/2004 |

(Continued)

OTHER PUBLICATIONS

Search Report from German Patent and Trademark Office for DE102018130388.2, dated Sep. 17, 2019.

(Continued)

*Primary Examiner* — Josh Skroupa
(74) *Attorney, Agent, or Firm* — Wiggin and Dana LLP; Rikesh P. Patel

(57) ABSTRACT

A device for compensating for tolerances between two components to be connected by means of a connecting screw, comprising a base element, a compensating element which can be moved out of the base element, the base element and the compensating element forming a passage for the connecting screw, which passage defines an axial direction, and a retaining element for retaining the base element.

18 Claims, 8 Drawing Sheets

(56) References Cited

U.S. PATENT DOCUMENTS

| | | | | |
|---|---|---|---|---|
| 7,878,745 | B2* | 2/2011 | Allen | F16B 27/00 |
| | | | | 411/175 |
| 8,231,317 | B2* | 7/2012 | De Gelis | F16B 5/0266 |
| | | | | 411/174 |
| 8,696,279 | B2* | 4/2014 | Sbongk | F16B 5/0635 |
| | | | | 411/174 |
| 9,267,529 | B2* | 2/2016 | Tejero Salinero | F16B 37/041 |
| 9,482,264 | B2* | 11/2016 | Lutgenau | F16B 5/0283 |
| 9,511,544 | B2* | 12/2016 | Hemingway | F16B 5/0233 |
| 9,738,135 | B2* | 8/2017 | Gonzalez Rechea | |
| | | | | F16B 5/0258 |
| 9,816,547 | B2* | 11/2017 | Costabel | F16B 37/044 |
| 10,047,783 | B2* | 8/2018 | Mills | F16B 37/044 |
| 10,533,588 | B2* | 1/2020 | Yoyasu | F16B 5/0635 |
| 10,670,069 | B2* | 6/2020 | Costabel | F16B 5/0635 |
| 10,823,217 | B2* | 11/2020 | Costabel | F16B 5/0635 |
| 2018/0298936 | A1* | 10/2018 | Brautigam | F16B 5/0233 |

FOREIGN PATENT DOCUMENTS

| | | | | |
|---|---|---|---|---|
| DE | 102006034463 | B3 | 1/2008 | |
| DE | 102008055526 | A1 | 6/2010 | |
| DE | 102013200999 | A1 | 7/2014 | |
| DE | 102013202582 | A1 | 8/2014 | |
| DE | 102015104963 | A1 * | 10/2015 | ............ F16B 37/041 |
| DE | 102015104963 | A1 | 10/2015 | |
| EP | 1304489 | A2 | 4/2003 | |
| EP | 1970574 | A2 | 9/2008 | |
| EP | 2495453 | A2 | 9/2012 | |
| JP | 2008256058 | A * | 10/2008 | ............. F16B 5/025 |

OTHER PUBLICATIONS

European Patent Office, search report for EP19212035.0, dated Apr. 23, 2020.

* cited by examiner

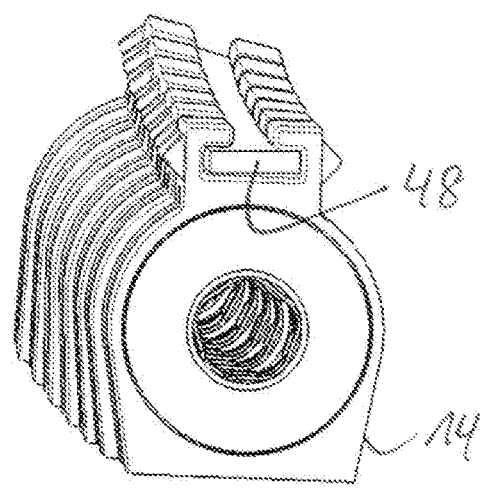
FIG. 6B
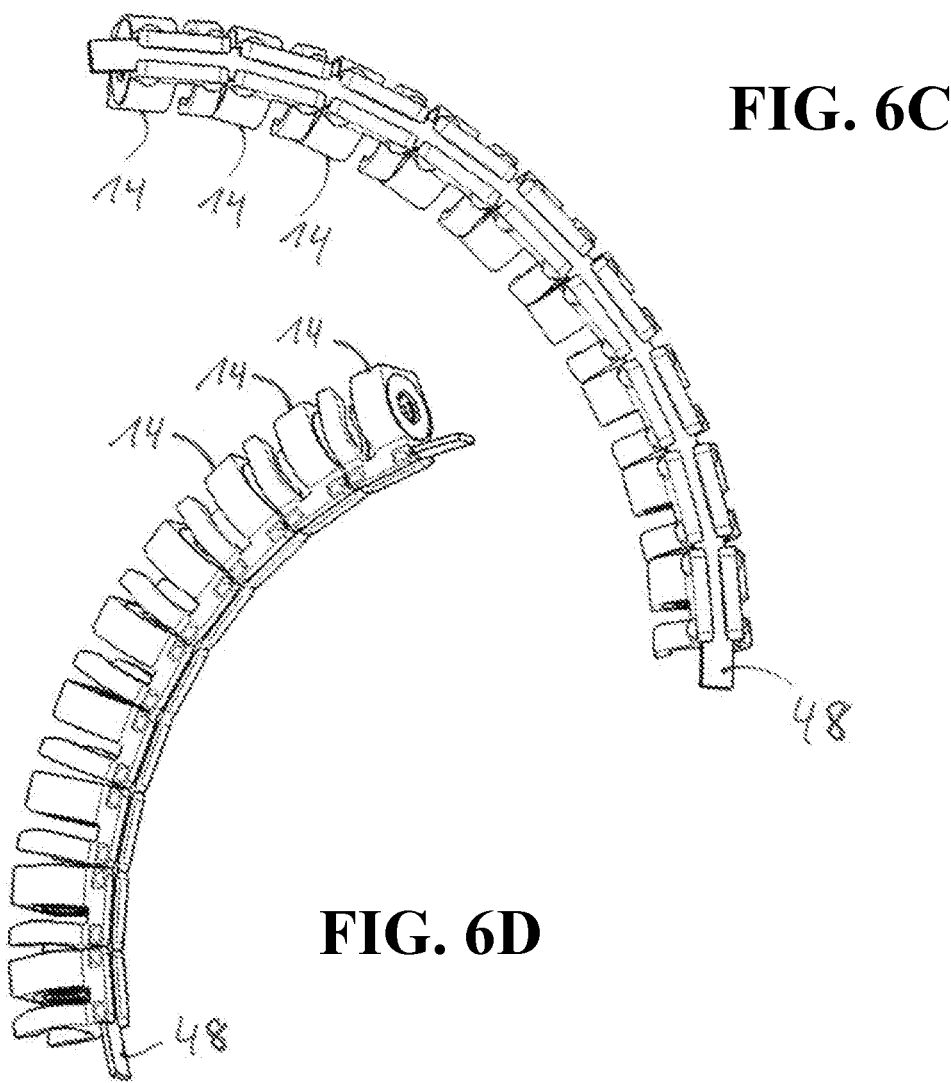
FIG. 6C
FIG. 6D

TOLERANCE-COMPENSATING DEVICE

CROSS-REFERENCE TO RELATED APPLICATION

The present application claims priority to German Patent Application No. 102018130388.2 that was filed Nov. 29, 2018, the contents of which is hereby incorporated by reference in its entirety.

TECHNICAL FIELD

The present invention relates to a device for compensating for tolerances between two components to be connected by means of a connecting screw, comprising a base element, a compensating element which can be moved out of the base element, the base element and the compensating element forming a passage for the connecting screw, which passage defines an axial direction, and a retaining element for retaining the base element.

BACKGROUND

A tolerance-compensating device of this kind is known in principle. The base element and the compensating element are usually in left-hand threaded engagement, while the connecting screw has a right-hand external thread. A spring element is arranged in the compensating element, which spring element produces a frictional connection between the connecting screw extending through the passage and the compensating element. Axially extending latching legs are formed on the retaining element, which legs are clipped into latching openings provided for this purpose in the first component in order to pre-mount the tolerance-compensating device on a first of the components. Moreover, a nut element for the connecting screw is non-rotatably attached to the first component. If the connecting screw for screwing together the components is guided through the components and the tolerance-compensating device and screwed into the nut element, then, owing to the frictional connection, the compensating element rotates out of the base element until said compensating element abuts the second component and the spacing between the components is bridged by the tolerance-compensating device.

BRIEF SUMMARY OF THE INVENTION

The problem addressed by the present invention is that of providing a tolerance-compensating device of the type mentioned at the outset which can be pre-mounted on the first component without said component being specifically prepared.

The problem is solved by a tolerance-compensating device having the features of claim 1 and is solved in particular in that the retaining element forms a latching portion for latching to a nut element provided for the connecting screw.

The general concept underlying the invention is that of not latching the retaining element directly in a first of the components, but rather using the nut element provided in any case on the first component. The tolerance-compensating device according to the invention is therefore latched merely indirectly to the first component such that the first component does not need to be specially prepared for the latching. This makes it easier to pre-mount the tolerance-compensating device since the first component does not need to be provided with latching openings, and also prevents weakening of the first component due to latching openings of this kind.

Advantageous embodiments of the invention can be found in the dependent claims, the description and the drawings.

According to an embodiment, the latching portion extends transversely, in particular at a right angle to the axial direction. For latching to the nut element, the tolerance-compensating device can thus be slid onto the first component from the side, thus virtually radially, as a result of which it is possible to pre-mount the tolerance-compensating device on the first component, even under restricted spatial conditions.

For example, the latching portion may comprise two latching arms that are spaced apart from each other and define a receiving portion for the nut element therebetween. In this case, it is advantageous if the latching arms are resiliently formed or supported and can spread apart against a restoring force in order to receive the nut element.

According to another embodiment, the retaining element is C-shaped when viewed in longitudinal section, in particular such that it forms a radially extending receiving space for receiving the first component. In this way, the retaining element can be slid laterally onto the first component and engage around the first component from above and from below.

The latching portion is, when viewed in the axial direction, preferably spaced apart from a retaining portion of the retaining element in which the base element is retained. In this way, the latching portion and the retaining portion come to rest on opposite sides of the first component, as a result of which the tolerance-compensating device, in the pre-mounted state, is secured more reliably to the first component.

In order to facilitate mounting the tolerance-compensating device on the first component, the latching portion and/or the retaining portion is/are advantageously provided with lead-in chamfers.

According to another embodiment, the latching portion and the retaining portion are interconnected by a connecting portion. The connecting portion forms virtually the backbone of the retaining element and preferably extends in the axial direction.

The connecting portion is advantageously substantially cuboid. This facilitates correct alignment of the tolerance-compensating device in a magazine as well as handling of the tolerance-compensating device by means of a robot. The tolerance-compensating device can also be more effectively prevented from tilting in a magazine if the connecting portion forms projecting guide elements on opposite side faces. Two axially spaced-apart guide elements are preferably formed on each side face. In addition, at least one of the guide elements may be formed in the manner of a prism or a hipped-roof. It is also conceivable for at least one guide element to be in the form of a notch.

According to an embodiment that can be produced particularly economically, the retaining element is integrally formed. For example, the retaining element can have a plastics material. This may be in particular an injection-molded part.

According to yet another embodiment, a ferromagnetic insert is embedded into the retaining element, in particular into a connecting portion of the retaining element. This facilitates handling of the tolerance-compensating device by means of a robot and thus contributes to even simpler pre-mounting of the tolerance-compensating device on the first component.

According to yet another embodiment, the retaining element has a T-slot. The T-slot can in particular extend in the axial direction and/or be formed on a back side of a connecting portion of the retaining element opposite the latching portion. Such a T-slot makes it possible to thread the tolerance-compensating device and preferably a plurality of tolerance-compensating devices onto a correspondingly formed T-shaped carrier or a carrier strip for the purpose of transport and/or storage. If the carrier strip is flexible, it is also particularly suitable for supplying the tolerance-compensating devices threaded thereon to a robot for automated pre-mounting of the tolerance-compensating devices.

BRIEF DESCRIPTION OF THE DRAWINGS

The invention is described in the following purely by way of example with the aid of a possible embodiment and with reference to the drawings, in which:

FIGS. 6A to 6D are different views of a plurality of tolerance-compensating devices of FIG. 1 which are threaded onto a flexible carrier strip;

DETAILED DESCRIPTION OF THE INVENTION

Figure 1A:
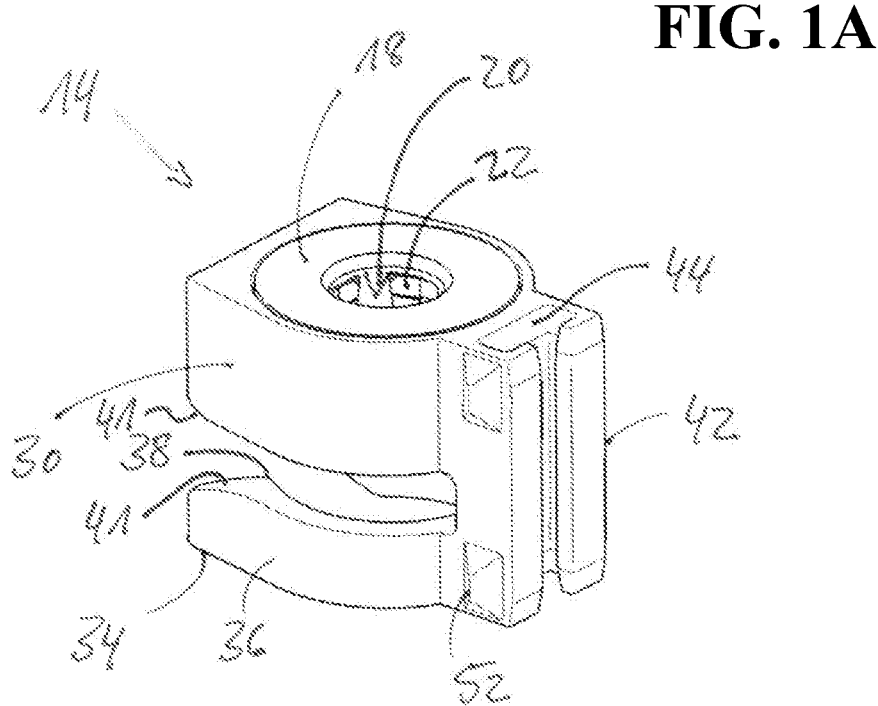
FIGS. 1A and 1B are perspective views of a tolerance-compensating device according to a first embodiment of the invention.
Figure 1B:
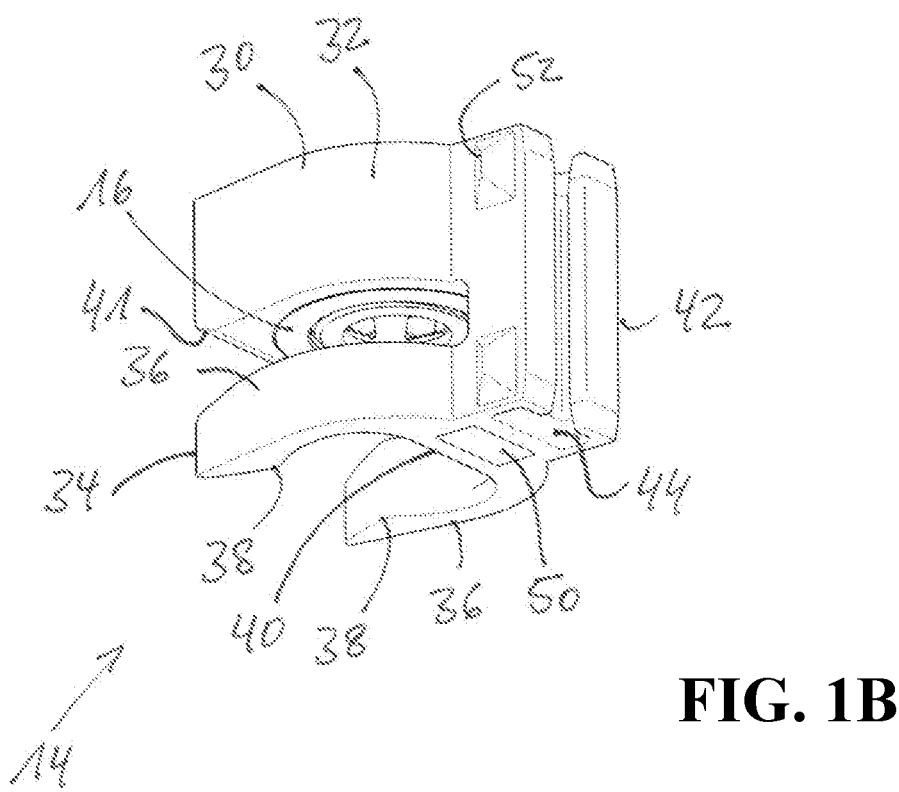

FIGS. 1 to 4 show a tolerance-compensating device 14 according to a first embodiment. The tolerance-compensating device 14 comprises a base element 16 and a compensating element 18 which is in left-hand threaded engagement with said base element. For this purpose, the base element 16 forms a left-hand internal thread 16a, while the compensating element 18 has a correspondingly formed external thread 18a. The thread axes of the internal thread 16a and the external thread 18a define an axial direction.

The base element 16 and the compensating element 18 form a passage 20 for a connecting screw (not shown), which passage extends in the axial direction. A spring element 22 is inserted into the part of the passage 20 defined by the compensating element 18, which spring element is provided to produce a frictional connection between the connecting screw extending through the passage 20 and the compensating element 18.

Figure 2:
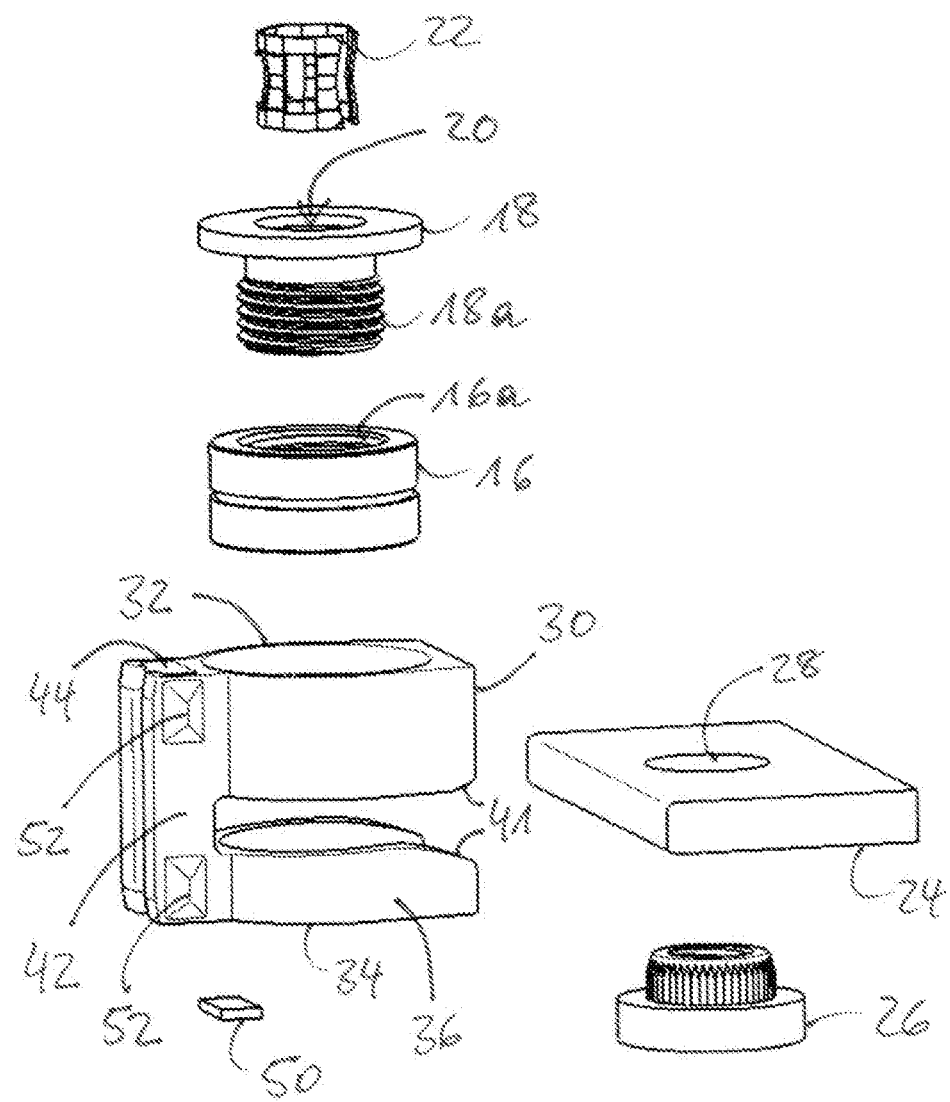
FIG. 2 is an exploded view of the tolerance-compensating device of FIG. 1.

The connecting screw is used to screw together two components which are spaced apart from each other and of which a first component 24 is shown in FIG. 2. A nut element 26 for the connecting screw is non-rotatably attached to the first component 24.

In the present embodiment, the nut element 26 is a press nut which is pressed into a correspondingly provided receiving hole 28 in the first component 24. In this context, the term "press nut" is also understood to mean press-in nuts, blind-rivet nuts, flare nuts, drive(-in) nuts, etc. Moreover, it is conceivable to fasten the nut element 26 to the first component 24 in another way, for example by gluing or welding.

The tolerance-compensating device 14 further comprises a retaining element 30 formed of a plastics material, in which retaining element the base element 16 is non-rotatably retained. In the present embodiment, the base element 16 is pressed into the retaining element 30. However, it is also conceivable to glue the base element 16 into the retaining element 30 or to shrink or injection-mold the retaining element 30 onto the base element 16. Specifically, the base element 16 is fitted in a retaining portion 32 of the retaining element 30, which portion extends substantially at a right angle to the axial direction.

Moreover, the retaining element 30 forms a latching portion 34 which also extends substantially at a right angle to the axial direction. The latching portion 34 has an axial spacing from the retaining portion 32 that is adapted to the thickness of the first component 24.

Figure 4:
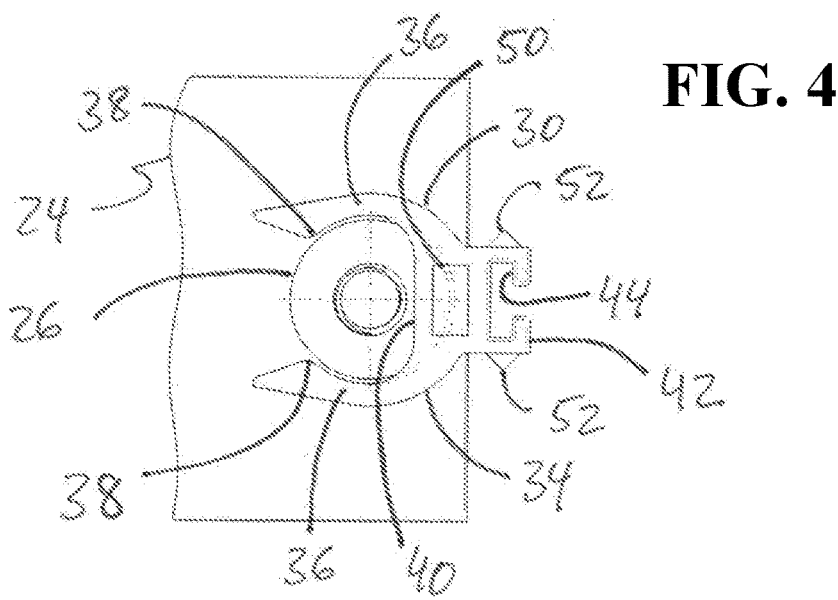
FIG. 4 is a plan view from below of the tolerance-compensating device of FIG. 1 in a state in which is fully pre-mounted on a component.

The latching portion 34 comprises two latching arms 36 which are spaced apart from each other, curved slightly toward each other and define a receiving portion for the nut element 26 therebetween. The latching arms 36 have a particular resilience such that they can spread apart against a restoring force when pushed in a radial direction onto the nut element 26 and spring back into their rest position as soon as the nut element 26 is received in the receiving portion (FIG. 4). In order to prevent the latching portion 34 from unintentionally detaching from the received nut element 26, the latching arms 36 have, in the region of their free ends, mutually facing latching projections 38. For reinforcing the latching arms 36, they are connected, in the region of their bottom, by a reinforcing element 40 which partially projects over the nut element 26 that is received in the receiving portion.

Figure 3A:
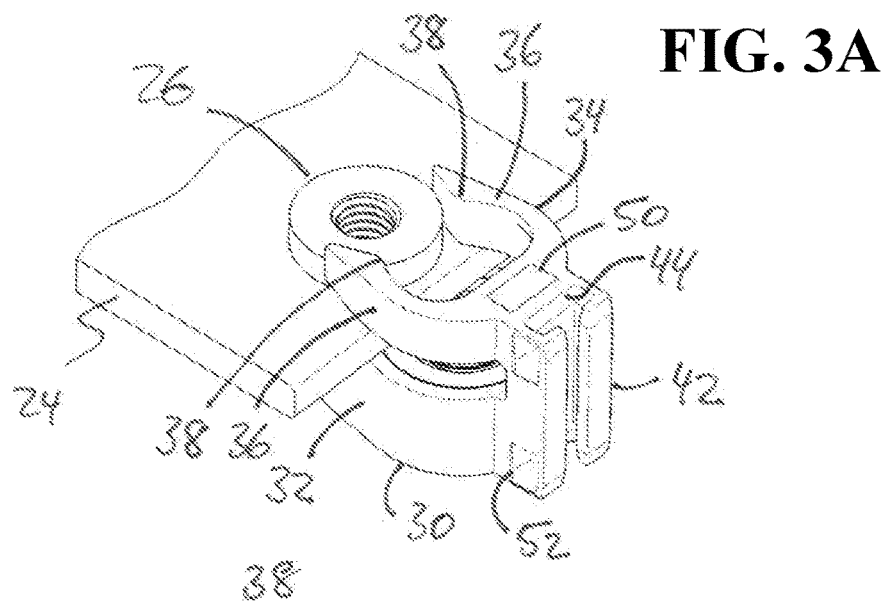
FIG. 3A is a perspective view of the tolerance-compensating device of FIG. 1 in a state in which it is partially pre-mounted on a component.
Figure 3B:
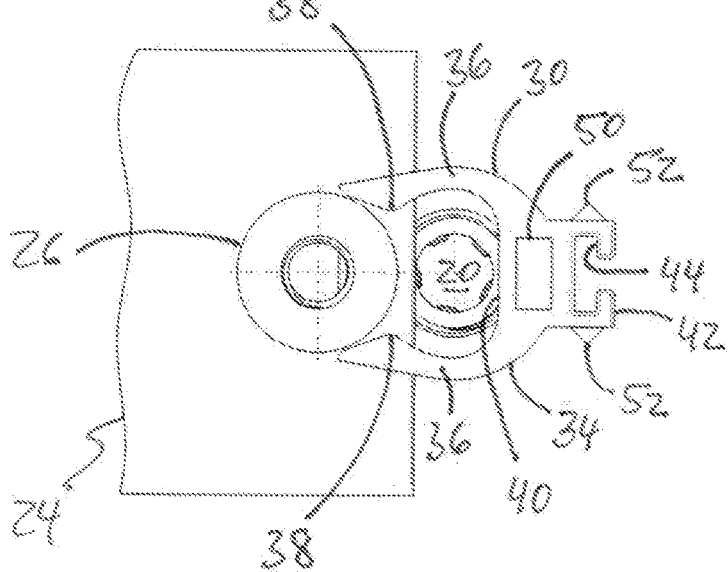
FIG. 3B is a plan view from below of the tolerance-compensating device of FIG. 1 in a state in which is partially pre-mounted on a component.

To pre-mount the tolerance-compensating device 14 on the first component 24, the tolerance-compensating device 14 is slid laterally, i.e. in a radial direction, onto the first component 24 such that the first component is received between the retaining portion 32 and the latching portion 34 and the latching portion 34 latches to the nut element 26, as shown in FIGS. 3 and 4. In order to facilitate sliding the tolerance-compensating device 14 onto the first component 24, lead-in chamfers 41 are formed both in the region of the free ends of the latching arms 36 and in the corresponding region of the retaining portion 32.

In the pre-mounted state, the tolerance-compensating device 14 does not necessarily have to be fitted on the component 24 without clearance. Instead, a particular clearance of the tolerance-compensating device 14 latched to the nut element 26 is desired, at least in a radial direction, but possibly also in an axial direction, since this facilitates the subsequent screwing together of the components, in particular the alignment of the tolerance-compensating device 14 with the connecting screw.

In order to screw together the components, the connecting screw is inserted through a corresponding hole in the component (not shown) and (in FIG. 1 from above) guided through the passage 20 in the tolerance-compensating device 14 and screwed into the nut element 26. Owing to the opposite-hand threads of the connecting screw and the tolerance-compensating device 14, while the connecting screw is being screwed into the nut element 26, the compensating element 18 is rotated out of the base element 16 due to the frictional connection produced by the spring element 22 until said compensating element abuts the second component (not shown). From this point in time, the spacing between the components is bridged by the extended tolerance-compensating device 14 and the components can be clamped together by tightening the connecting screw.

The retaining portion 32 and the latching portion 34 are interconnected by means of a connecting portion 42 which extends in the axial direction and forms virtually the backbone of the retaining element 30. The connecting portion 42 has a cuboid basic shape and forms a T-slot 44 on the back side thereof facing away from the latching arms 36.

Figure 5A:
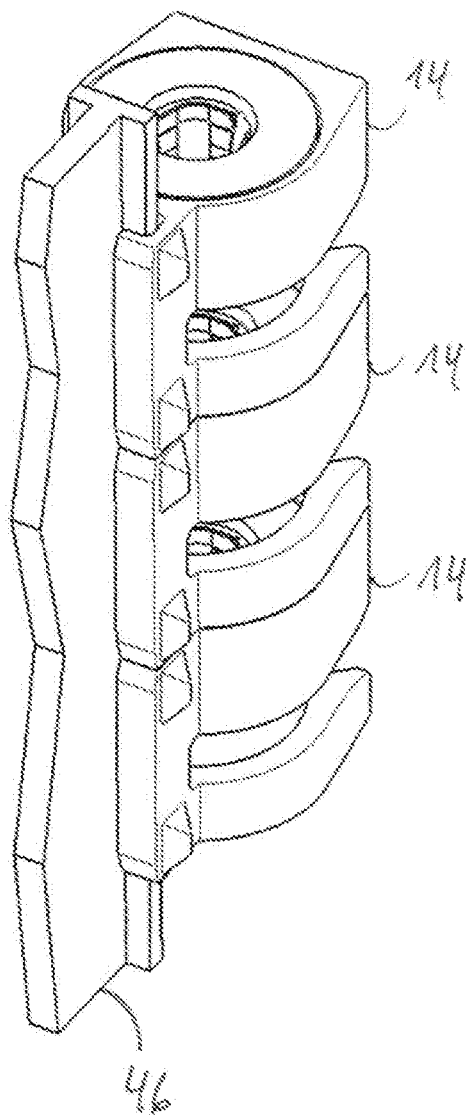
FIGS. 5A and 5B are perspective views of a plurality of tolerance-compensating devices of FIG. 1 which are threaded onto a T-shaped carrier.
Figure 5B:
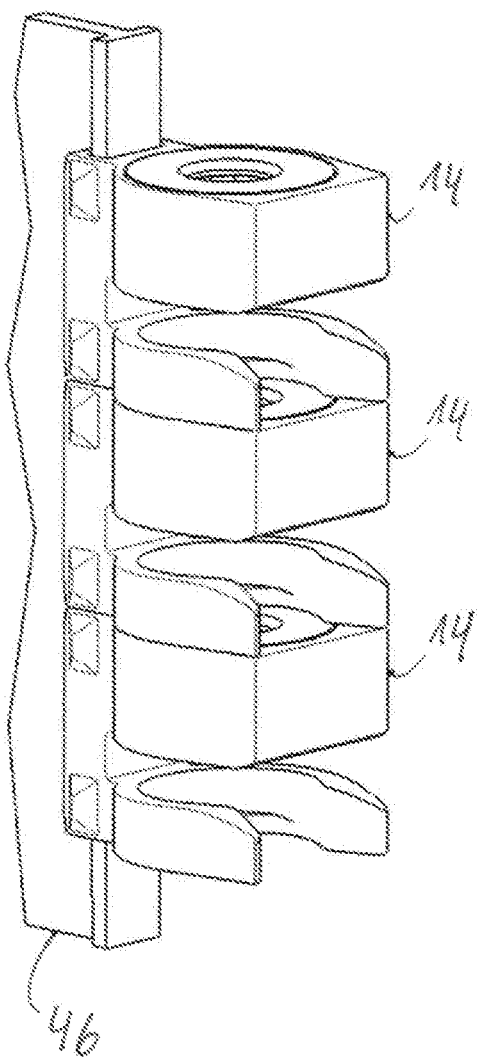

By means of the T-slot 44, the tolerance-compensating device 14 can be slid onto a correspondingly formed T-shaped carrier 46 for transport and/or storage purposes, as shown in FIG. 5 by means of three tolerance-compensating devices 14.

Figure 6A:
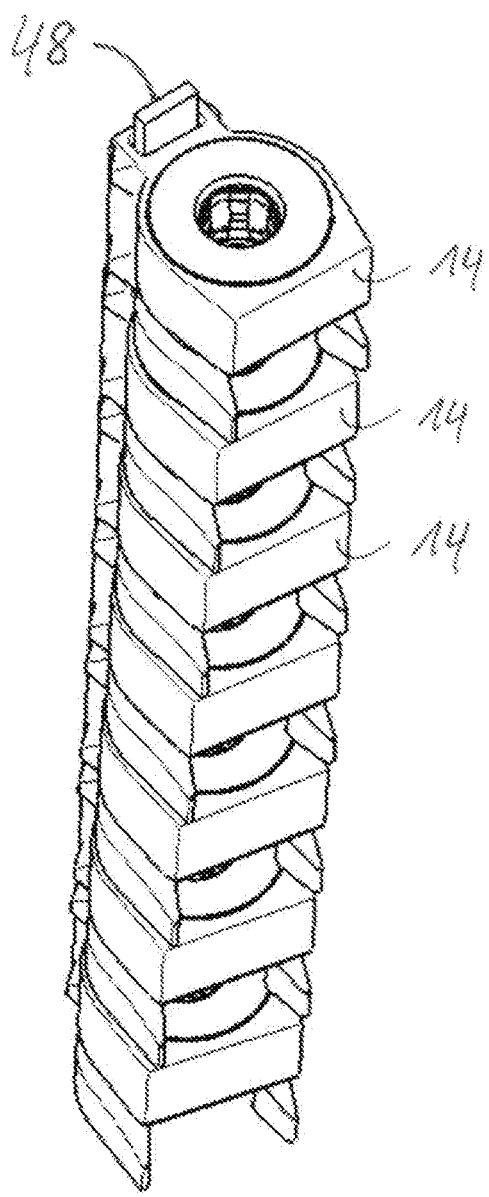

Alternatively, the T-slot 44 makes it possible to thread the tolerance-compensating device 14 onto a flexible carrier strip 48. FIG. 6 shows a carrier strip 48 of this kind having a large number of tolerance-compensating devices 14 threaded thereon. Such a design is suitable, for example, for supplying the tolerance-compensating devices 14 to a robot for automated pre-mounting of the tolerance-compensating devices 14 on one or more components 24.

Such a robot may in principle be a gripper robot. Alternatively or additionally, however, the robot may also have a magnet for retaining the tolerance-compensating devices 14. For interaction with the magnet of the robot, an insert 50 made of a ferromagnetic material, for example sheet steel, is embedded into the retaining element 30, in the present embodiment in the region between the T-slot 44 and the reinforcing element 40.

Figure 8:
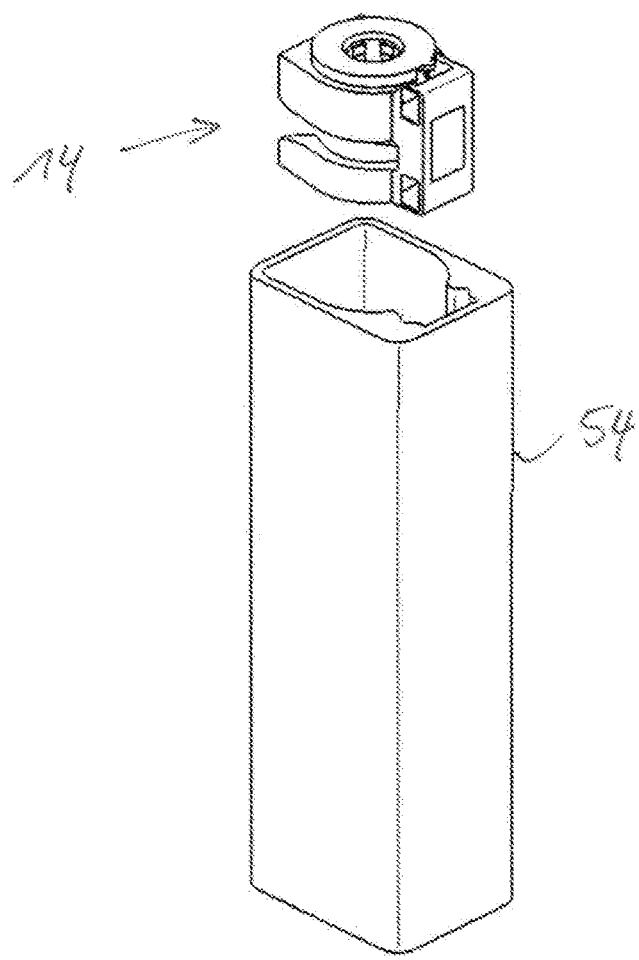
FIG. 8 shows a magazine for receiving tolerance-compensating devices according to FIG. 1 or FIG. 7.

In addition, in each case two axially spaced-apart prism-like or hipped-roof-like guide elements 52 are provided on opposite outer sides of the connecting portion 42, which guide elements are used to additionally guide the tolerance-compensating device 14 in a magazine 54, as shown in FIG. 8.

Figure 7:
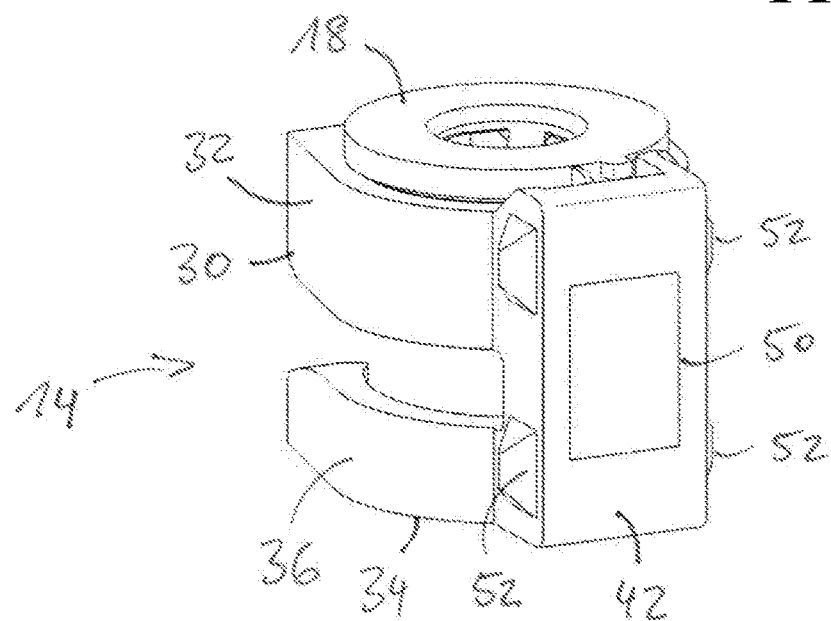
FIG. 7 shows a tolerance-compensating device according to a second embodiment of the invention.

FIG. 7 shows a tolerance-compensating device 14 according to a second embodiment, which ultimately differs from the above-described first embodiment only in that the retaining element 30 does not have a T-slot 44, but instead the insert 50 made of ferromagnetic material is embedded into the back side of the connecting portion 42 facing away from the latching arms 36.

Figure 9:
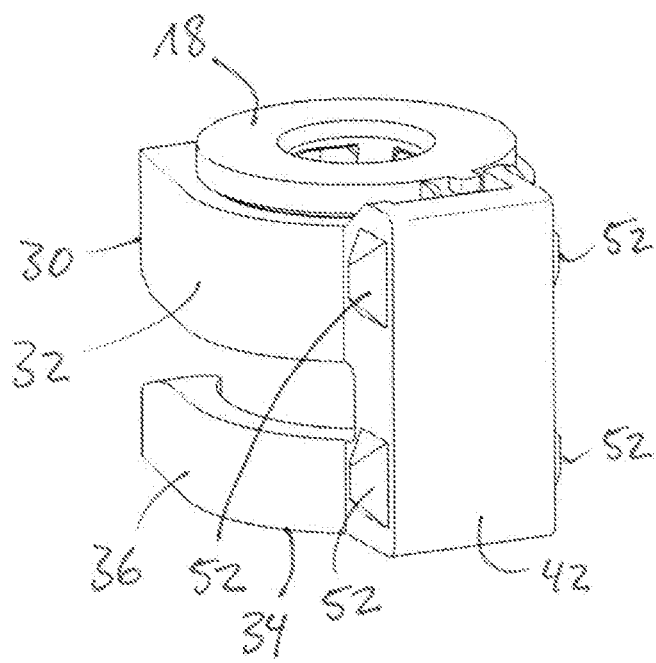
FIG. 9 shows a tolerance-compensating device according to a third embodiment of the invention.

It is understood that the insert 50 can in principle also be omitted, as shown by the tolerance-compensating device 14 according to a third embodiment shown in FIG. 9, which otherwise does not differ from the second embodiment shown in FIG. 7.

Figure 10:
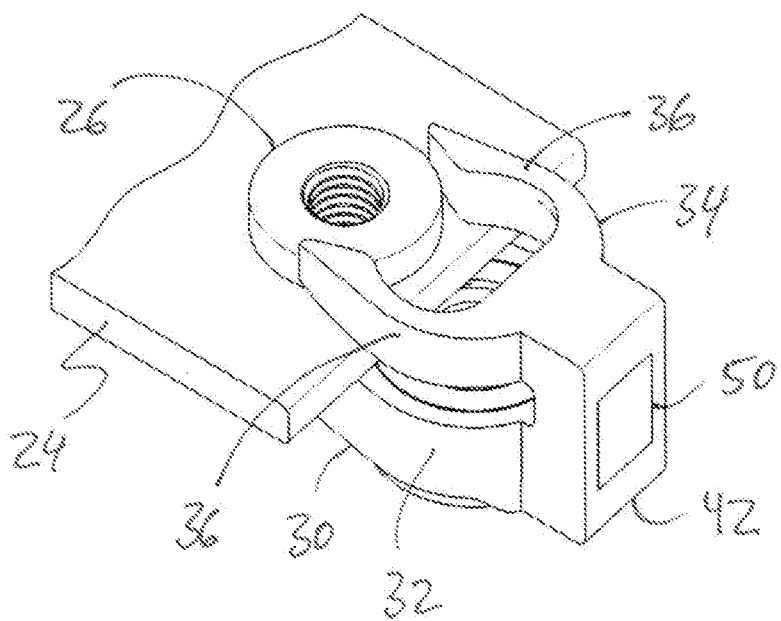
FIG. 10 shows a tolerance-compensating device according to a fourth embodiment of the invention.

Moreover, a fourth embodiment (FIG. 10) is also conceivable which has an insert 50 but does not have guide elements 52 and which otherwise does not differ from the second embodiment.

LIST OF REFERENCE NUMERALS

14 Tolerance-compensating device
16 Base element
18 Compensating element
16a Internal thread
18a External thread
20 Passage
22 Spring element
24 First component
26 Nut element
28 Receiving hole
30 Retaining element
32 Retaining portion
34 Latching portion
36 Latching arm
38 Latching projection
40 Reinforcing element
41 Lead-in chamfer
42 Connecting portion
44 T-slot
46 T-shaped carrier
48 Carrier strip
50 Insert
52 Guide element
54 Magazine

The invention claimed is:

1. A device for compensating for tolerances between two components to be connected by means of a connecting screw, the device comprising:
   a base element,
   a compensating element which can be moved out of the base element, the base element and the compensating element forming a passage for the connecting screw, which passage defines an axial direction, and
   a retaining element for retaining the base element, with the retaining element forming a latching portion for latching to a nut element provided for the connecting screw,
   wherein the latching portion is C-shaped and comprises two latching arms which are spaced apart from one another and define a receiving portion for the nut element therebetween, and
   wherein the latching arms are resiliently formed or supported and are configured to spread apart against a restoring force upon radially sliding the latching portion onto the nut element in order to receive the nut element.

2. The device according to claim 1, wherein the latching portion extends transversely to the axial direction.

3. The device according to claim 2, wherein the latching portion extends at a right angle to the axial direction.

4. The device according to claim 1, wherein the retaining element is C-shaped when viewed in longitudinal section.

5. The device according to claim 1, wherein the retaining element forms a radially extending receiving space for receiving one of the components.

6. The device according to claim 1, wherein the latching portion is, when viewed in the axial direction, spaced apart from a retaining portion of the retaining element in which the base element is retained.

7. The device according to claim 6, wherein at least one of the latching portion and the retaining portion is provided with lead-in chamfers.

8. The device according to claim 6, wherein the latching portion and the retaining portion are interconnected by a connecting portion.

9. The device according to claim 8, wherein the connecting portion extends in the axial direction.

10. The device according to claim 8, wherein the connecting portion is substantially cuboid.

11. The device according to claim 8, wherein the connecting portion forms projecting guide elements on opposite side faces.

12. The device according to claim 11, wherein two axially spaced-apart guide elements are formed on each side face.

13. The device according to claim 11, wherein at least one of the guide elements is formed in the manner of a prism or a hipped-roof.

14. The device according to claim 1, wherein the retaining element is at least one of integrally formed and an injection molded part; and/or wherein the retaining element has a plastics material.

15. The device according to claim 1, wherein a ferromagnetic insert is embedded into the retaining element.

16. The device according to claim 15, wherein the ferromagnetic insert is embedded into a connecting portion of the retaining element.

17. The device according to claim 1, wherein the retaining element has a T-slot.

18. The device according to claim 17, wherein the T-slot extends in the axial direction and/or is formed on a back side of a connecting portion of the retaining element opposite the latching portion.

* * * * *